United States Patent [19]

Grimes et al.

[11] 4,312,735

[45] Jan. 26, 1982

[54] SHUNT CURRENT ELIMINATION

[75] Inventors: Patrick G. Grimes, Westfield, N.J.; Markus Zahn, Gainesville, Fla.; Richard J. Bellows, Westfield, N.J.

[73] Assignee: Exxon Research & Engineering Co., Florham Park, N.J.

[21] Appl. No.: 160,143

[22] Filed: Jun. 16, 1980

Related U.S. Application Data

[63] Continuation-in-part of Ser. No. 97,194, Nov. 26, 1979.

[51] Int. Cl.³ .................... C25B 15/08; C25B 9/04; C25C 7/00; H01M 8/24

[52] U.S. Cl. .................... 204/228; 204/255; 204/257; 204/268; 204/269; 429/18; 429/88

[58] Field of Search .................... 204/228, 267-270, 204/253-258, 237, 1 R, 231, 275, 129, 128, 98; 429/12, 18, 111, 88

[56] References Cited

U.S. PATENT DOCUMENTS

| | | | |
|---|---|---|---|
| 3,316,167 | 4/1967 | Clarke, Jr. et al. | 204/268 |
| 3,522,098 | 7/1970 | Sturm et al. | 429/18 |
| 3,537,904 | 11/1970 | Matsuda et al. | 429/18 |
| 3,666,561 | 5/1972 | Chiku | 429/18 |
| 3,785,951 | 1/1974 | Fleck | 204/268 |
| 4,049,878 | 9/1977 | Lindstrom | 429/18 |
| 4,081,585 | 3/1978 | Jacquelin | 429/23 |
| 4,136,232 | 1/1979 | Durand | 429/15 |
| 4,197,169 | 4/1980 | Zahn et al. | 204/228 |

FOREIGN PATENT DOCUMENTS

| | | | |
|---|---|---|---|
| 1367673 | 9/1974 | United Kingdom | 429/18 |

*Primary Examiner*—Donald R. Valentine
*Attorney, Agent, or Firm*—Robert S. Salzman

[57] ABSTRACT

Shunt currents can be eliminated in electrochemical devices by introducing nulling currents via auxiliary electrodes. The invention teaches the reduction or elimination of these shunt currents in such devices with minimized power consumption. Shunt current nulling tunnels are provided which interconnect with electrolyte supply channels feeding the cells of the electrochemical device. Power consumption for the shunt current-nulling tunnels is reduced by designing the tunnels to have an increasing electrical resistance towards their mid-portions. Another embodiment of the invention features an increasing electrical resistance towards the mid-portion of the tunnels and a decreasing electrical resistance towards the mid-portion of the manifolds.

33 Claims, 6 Drawing Figures

FIG. 1
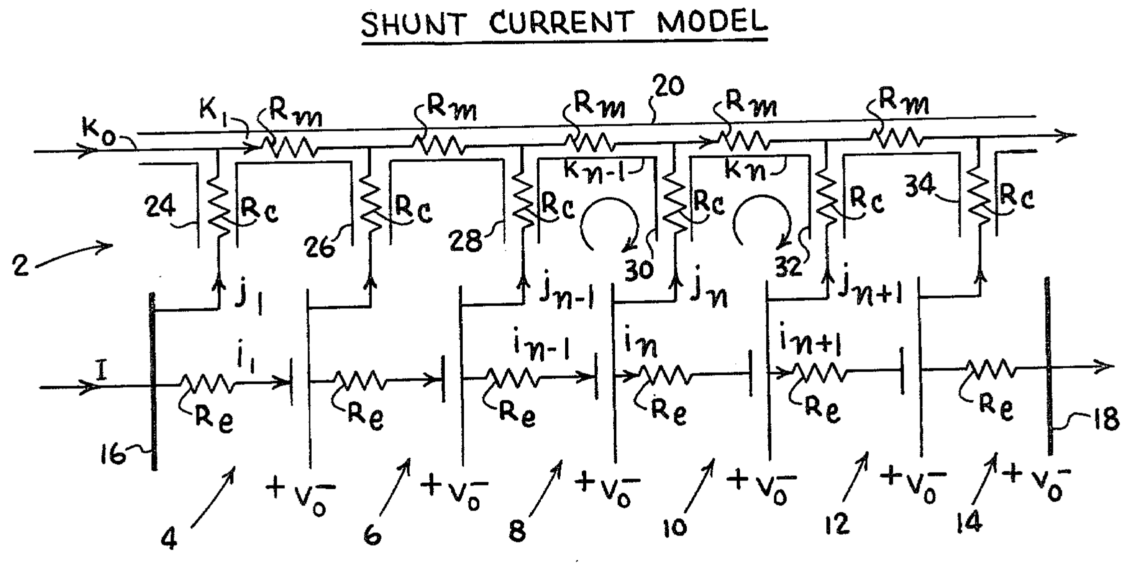
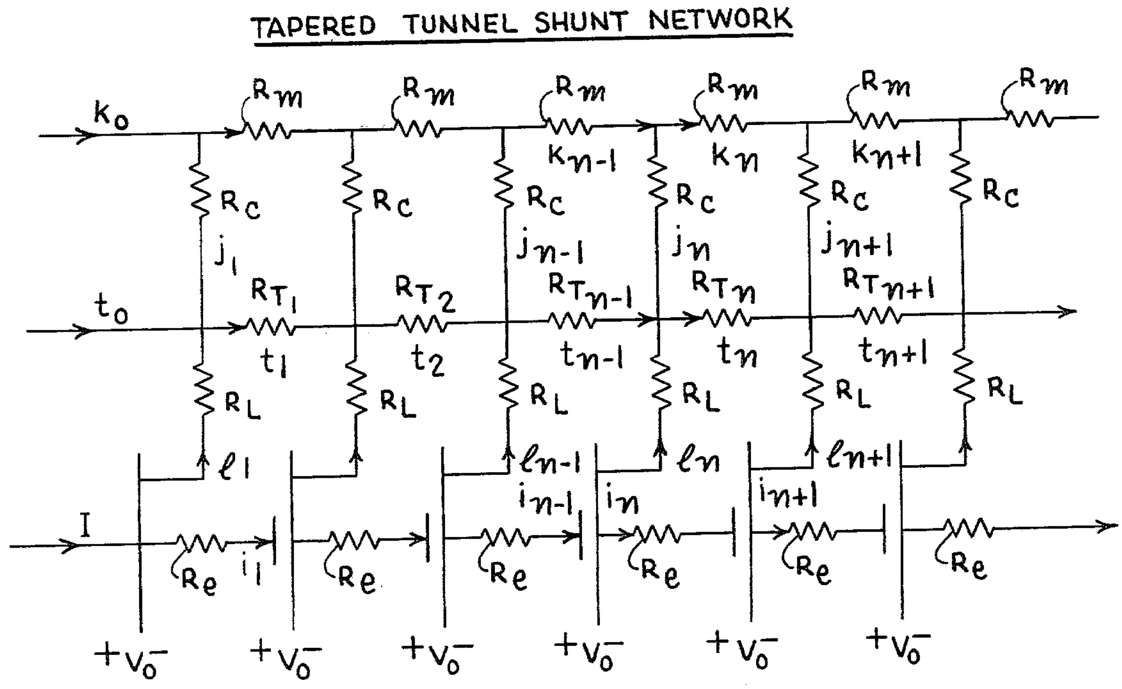
FIG. 4

TAPERED TUNNEL AND TAPERED MANIFOLD SHUNT NETWORK

SHUNT CURRENT ELIMINATION

CROSS-REFERENCE TO RELATED APPLICATIONS

This application is a continuation-in-part of Ser. No. 97,194, filed Nov. 26, 1979. Other related U.S. patent applications are Ser. No. 939,325, filed Sep. 5, 1978 now U.S. Pat. No. 4,192,168; Ser. No. 122,193, filed Feb. 19, 1980; and Ser. No. 122,706, filed Feb. 19, 1980.

RELATED APPLICATIONS

This application is a continuation-in-part of the previously filed U.S. patent application by P. G. Grimes and M. Zahn, entitled "SHUNT CURRENT ELIMINATION AND DEVICE EMPLOYING TUNNELED PROTECTIVE CURRENT", Ser. No. 97,194, filed Nov. 26, 1979.

Other related U.S. patent applications are by M. Zahn, P. G. Grimes, and R. J. Bellows for "SHUNT CURRENT ELIMINATION AND DEVICE", Ser. No. 939,325, filed Sep. 5, 1978, by R. J. Bellows and P. G. Grimes for "ANNULAR ELECTRODES FOR SHUNT CURRENT ELIMINATION", now U.S. Pat. No. 4,197,169, Ser. No. 122,193, filed Feb. 19, 1980; and by R. J. Bellows, P. G. Grimes and C. W. Elspass for "IMPROVEMENTS IN ANNULAR ELECTRODES FOR SHUNT CURRENT ELIMINATION", Ser. No. 122,706, filed Feb. 19, 1980.

The teachings of all of the above-identified inventions are meant to be incorporated into this application for Letters Patent by way of reference.

FIELD OF THE INVENTION

This invention pertains to the reduction or elimination of shunt currents in electrochemical devices, and more particularly to the elimination of these shunt currents with minimized power consumption.

BACKGROUND OF THE INVENTION

In the electrochemical devices of all kinds, and, in particular, those battery systems having a plurality of cells immersed in a common electrolyte, shunt current losses are known to result from conductive current bypass paths which occur in the electrolyte surrounding the cells. Such shunt current losses are always present in these devices during charging, discharging and under open circuit conditions, and have undesirable side effects leading to the shortening of their useful life.

In a patent application assigned to a common assignee, by P. G. Grimes and M. Zahn, entitled "SHUNT CURRENT ELIMINATION AND DEVICE EMPLOYING TUNNELED PROTECTIVE CURRENT", U.S. Ser. No. 97,194, filed Nov. 26, 1979, it was demonstrated that the minimizing of shunt currents in an electrochemical device could be achieved by applying a protective current through one or more tunnels intersecting and connecting with electrolyte-carrying channels fluidically communicating with the cells of the electrochemical device.

This invention teaches the above reduction or elimination of shunt currents with a reduction in consumed power. As such, this invention is an improvement over this prior application.

DISCUSSION OF THE PRIOR ART

Two prior art devices which depict the reduction of leakage currents by nulling with electrodes are shown in the U.S. patents to P. Durand, entitled "ELECTROCHEMICAL GENERATORS WITH AUXILIARY CATHODE", U.S. Pat. No. 4,136,232, issued Jan. 23, 1979, and J. Jacquelin, entitled "FORCED FLOW ELECTROCHEMICAL BATTERY", U.S. Pat. No. 4,081,585, issued Mar. 28, 1978.

Unlike the present invention, however, the methods advanced by these patents cannot be universally applied to a large number or variety of electrochemical systems. Jacquelin teaches the use of a plurality of electrodes, one for each channel. The system is only applicable to a primary battery cell, whose cells are hydraulically connected in series. Durand illustrates the nulling of shunt current in an electrochemical device operating only in the discharge mode. Both these patents are generally wasteful of power, and do not propose efficient nulling methods, as is otherwise taught by the subject invention.

BRIEF SUMMARY OF THE INVENTION

The invention relates to an electrochemical device wherein the shunt currents are effectively reduced in an efficient power consuming manner. The electrochemical device is comprised of at least one common manifold fluidically communicating with a plurality of cells through corresponding channels. A common electrolyte for the cells is disposed in the manifold and channels, and provides an electrical electrolytic conductive bypass path around the cells which is capable of resulting in undesirable shunt currents.

At least one tunnel intersects and connects with each of the corresponding channels. The tunnel has a given electrical resistance as between the corresponding channels which increases towards a mid-portion of the tunnel. This will substantially eliminate any voltage difference between each of the cells and their corresponding tunnel and channel intersections, when a protective current is passed into the tunnel.

In another embodiment of this invention, the device may have both tapered tunnels and tapered manifolds with the manifolds having a given electrical resistance along the manifold which decreases towards its mid-portion.

BRIEF DESCRIPTION OF THE DRAWINGS

FIG. 1 is a schematic view of a resistor board analogue of an electrochemical device;

FIGS. 4 and 5 are schematic views of a resistor board analogue of electrochemical devices comprising the present invention.

DETAILED DESCRIPTION OF THE INVENTION

Figure 2A:
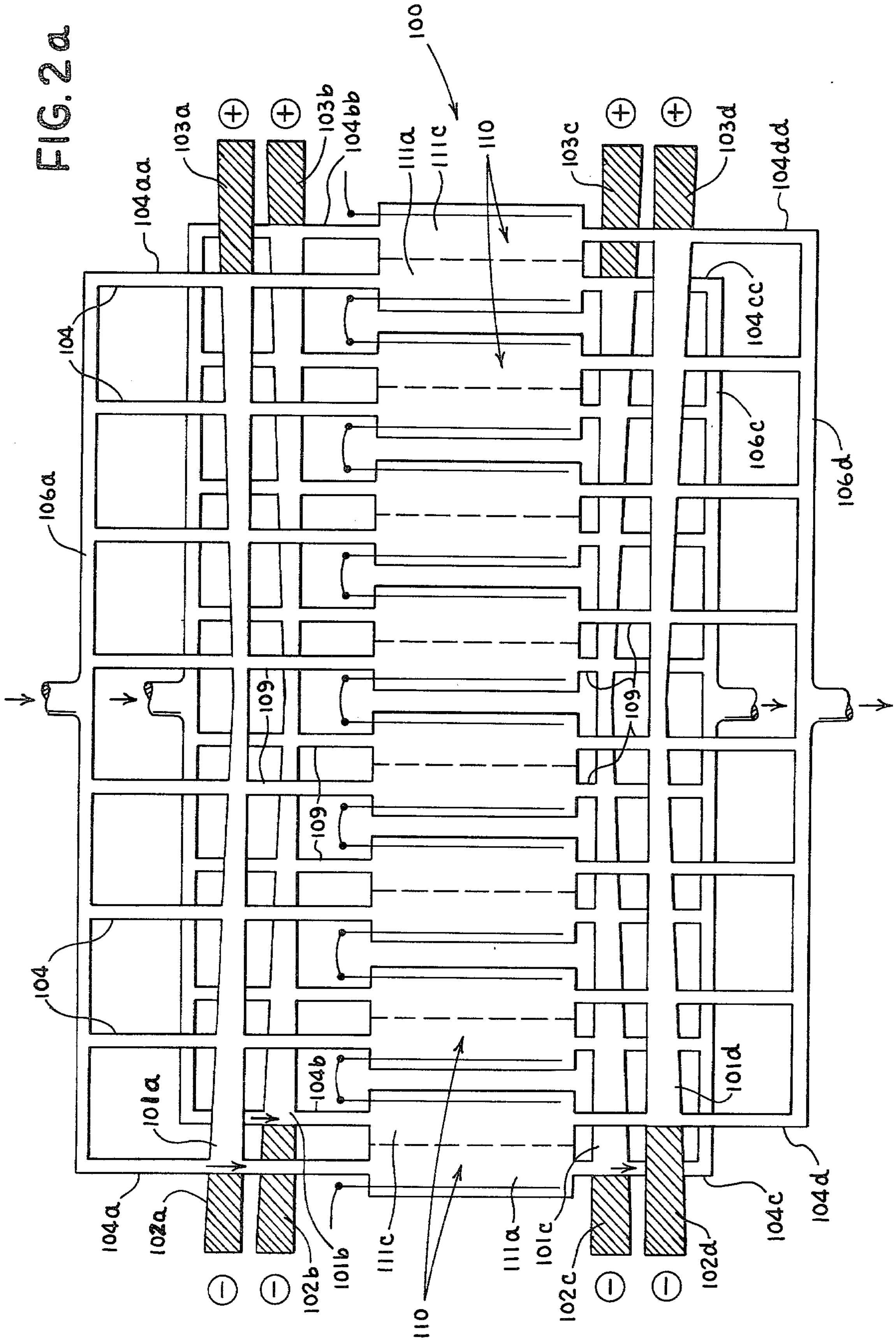
FIG. 2*a* is a schematic view of a dual electrolyte (anolyte and catholyte) multicell battery device featuring one embodiment of the present invention.

Generally speaking, in multicell electrochemical devices having a plurality of cells electrically connected in series and having an electrolyte which is a common electrolyte to two or more such cells and which includes shared electrolyte, shunt current losses occur as a result of electrical electrolytic conductive bypass paths through the electrolyte around the cells. The present invention is directed to the minimization of shunt currents in such systems and to devices for achieving this result, generally with minimized power consumption.

As used herein, the term "electrochemical device" may be one of the following: a photoelectrochemical device" may be one of the following: a photoelectrochemical device, a battery (primary or secondary), a fuel cell, a chloralkali cell, an electrowinning device, an electrorefining device, an electrolyzer, an electrochemical reactor, a monopolar or bipolar device, and a device having circulating or noncirculating electrolyte(s).

As used herein, the term "common electrolyte" shall mean an electrolyte which is employed in and distributed to two or more cells, the electrolyte comprising a physical continuum. In a circulating electrolyte system using one or more manifolds, the physical continuum includes the electrolyte contained within the manifolds, the branch channels and the cells. In a static electrolyte system, the physical continuum includes the electrolyte in the cells and the connecting areas of electrolyte, e.g., above or around the cells.

As used herein, the term "shared electrolyte" shall mean that portion of the electrolyte which is located in an area of commonality to the electrolyte contained in individual components. Thus, in a circulating electrolyte system using one or more manifolds, the electrolyte contained within manifold(s) is the shared electrolyte and electrolyte contained in branch channels, cells and other individual components is not shared electrolyte. In a static electrolyte system, the shared electrolyte is that electrolyte contained in the header space and/or common base areas of the device and not that electrolyte contained within each cell and within other individual components.

As used herein, the term "tapered tunnel" shall mean a protective current-carrying passage intersecting and connecting with each corresponding channel fluidically communicating between a manifold and a respective cell of an electrochemical device. The passage has a resistance which gradually or progressively, in a stepwise manner, in a telescoping fashion, or otherwise, changes in resistance as between each corresponding channel intersection towards a mid-portion of the tunnel. In an electrolyte-carrying tunnel, such a resistance increase can be effected by progressively constricting the tunnel towards its mid-portion. The tunnel, in another embodiment, may also comprise resistive elements disposed between the channels, each element being exceedingly more resistive than the previous element towards the mid-portion of the tunnel.

As used herein, the expression "minimization of shunt currents" shall be used to mean reduction of shunt currents or elimination of shunt currents.

In the development of the invention of co-pending U.S. patent application, Ser. No. 939,325, to Zahn et al, a resistance equivalent circuit model was derived for a multicell series electrochemical device having a common electrolyte which is physically connected in a continuum to the cells of the device via a common manifold or manifolds, establishing shared electrolyte, and through channels for each cell. The model was developed with the assumption that all of the cells in the device are identical. Based on this assumption, the governing circuit equations were written as linear, constant coefficient difference equations for which general closed form solutions were obtained for currents in the electrolyte within the cells (intracells), within the channels and within the manifold (shared electrolyte). Because the channel resistance was found generally to be much larger than the manifold and intracell electrolyte resistances, approximate algebraic solutions were also developed. It was demonstrated that a single externally imposed current passed from the last cell to the first cell through the manifold can result in minimization of shunt currents and, in fact, optimally, may effectively set all channel currents to zero.

Each cell was modeled as an ideal voltage source $V_o$ equal to its open circuit potential, in series, with an intracell electrolyte resistance $R_e$. Then, as shown in FIG. 1, the current through the electrodes divided so that some current passed through each channel into the manifold (shared electrolyte). The variables used in FIG. 1 are as follows:

$R_m$=manifold resistance;

$R_c$=channel resistance;

$R_e$=intracell electrolyte resistance (including internal components such as separators and membranes);

$V_o$=open circuit cell voltage;

V=actual cell voltage including ohmic voltage drop;

$i_n$=the principal electrolyte current through the nth cell;

$j_n$=the channel shunt current through the nth channel;

$k_n$=the manifold shunt current through the manifold between the nth and the nth+1 channels;

$k_o$=the current through the manifold needed to reduce shunt currents to zero; and I=the total terminal current through the electrochemical device.

As shown in FIG. 1, the prior art electrochemical device is illustrated schematically as 2 and contains cells 4, 6, 8, 10, 12, and 14, electrically connected in series. Current I passes through device 2 from end plate 16 to end plate 18, as shown. Common electrolyte (not shown) forms a single physical continuum through each cell via common manifold 20, containing shared electrolyte carried in parallel to each individual cell by channels 24, 26, 28, 30, 32, and 34. The resistance of the electrolyte in each cell is shown as $R_e$, the resistance of the manifold is shown as $R_m$ and the resistance of each channel is shown as $R_c$. The currents $i_n$, $j_n$ and $k_n$, as defined above, are also illustrated.

Each electrolyte section was modeled with its appropriate resistance. Kirchoff's current and voltage laws applied at the nth cell requires:

$$i_{n-1}-i_n=j_n \quad (1)$$

$$k_{n-1}-k_n=-j_n \quad (2)$$

$$k_{n-1}R_m-R_c(j_n-j_{n-1})-i_{n-1}R_e=V_o \quad (3)$$

The algebra is greatly simplified if equation (3) is rewritten with the index n increased by 1:

$$k_nR_m-R_c(j_{n+1}-j_n)-i_nR_e=V_o \quad (4)$$

Then by subtracting (4) from (3) the terms involving the i's and k's just equal $j_n$ from (1) and (2) so that a single equation for the channel shunt currents is obtained:

$$j_{n+1}-Bj_n+j_{n-1}=0 \quad (5)$$

wherein B is equal to $2+(R_e+R_m)/R_c$.

Just as linear constant coefficient differential equations have exponential solutions, linear constant coefficient difference equations as in (5) had power law solutions of the form:

$$j_n=A\lambda^n \tag{6}$$

wherein A is the amplitude and wherein the characteristic parameter λ(analogous to natural frequencies in continuous systems described by differential equations) was found by substituting the assumed solution of (6) back into (5):

$$A\lambda^{n-1}[\lambda^2-B\lambda+1]=0 \tag{7}$$

For non-trivial solution ($A\neq 0$, $\lambda\neq 0$), the bracketed term in (7) must be zero:

$$\lambda = B/2 \pm \sqrt{(B/2)^2-1} \tag{8}$$

Note that the two solutions in (8) are reciprocals of each other:

$$B/2+\sqrt{(B/2)^2-1} = \frac{1}{B/2-\sqrt{(B/2)^2-1}} \tag{9}$$

Because (5) is linear, the most general solution was a linear combination of both allowed solutions:

$$j_n=A_1\lambda^n+A_2\lambda^{-n} \tag{10}$$

where λ is either root in (8).

The amplitudes $A_1$ and $A_2$ were evaluated by the boundary conditions. By symmetry, the current in the first cell $j_1=J$ had an equal magnitude but opposite direction to the current in the last cell, $j_n=-J$.

$$j_1=J=A_1\lambda+A_2\lambda_n^{-1} \tag{11}$$

$$J_n=-J=A_1\lambda^n+A_2\lambda^{-n}$$

with solutions:

$$A_1=\frac{-J(1+\lambda^{-N+1})}{\lambda^N-\lambda^{-N+2}}$$

$$A_2=\frac{J\lambda(\lambda+\lambda^N)}{\lambda^N-\lambda^{-N+2}}$$

Applying algebraic reduction, the channel currents were:

$$j_n=\frac{J}{\lambda^N-\lambda}[-\lambda^n \div \lambda^{N-n+1}] \tag{12}$$

At this point, J was not yet known. However, $j_n$ was used in solving equations (1) and (2). Focusing attention on (1), the homogeneous solution was first found by assuming $j_n$ as zero. Assuming power law solutions, the natural solution was a constant:

$$i_{n-1}-i_n=0;\ i_n=Ap^n \tag{13}$$

$$Ap^{n-1}(l-p)=0;\ p=1;\ i_n=A \tag{14}$$

The driven solution must have the same power law dependence as the $j_n$ and so were of the same form as (10). The total solution was then:

$$i_n=I+\frac{J\lambda}{(\lambda^N-\lambda)(\lambda-1)}[\lambda^n+\lambda^{N-n}-1-\lambda^N] \tag{15}$$

where the constant A in (14) was adjusted so that $i_o=I$, where I is the terminal current. Under open circuit conditions, $I=0$. When the battery is being charged, I is positive; while under load, I is negative.

Similarly, the manifold shunt currents were:

$$k_n=k_o-\frac{J\lambda}{(\lambda^N-\lambda)(\lambda-1)}[\lambda^n+\lambda^{N-n}-1-\lambda^N] \tag{16}$$

where the initial manifold current $k_o$ was yet unspecified.

The important parameter J, which is the first channel current, was not yet known. Using (13), (14), (15), and (16) in (3) for any value of n (n=2 is the easiest), yielded (17) or (18):

$$J=\frac{V_o+IR_e-k_oR_m}{R_m+R_e+\left[\dfrac{R_c(\lambda-1)(\lambda^{N-1}+\lambda)}{(\lambda^N-\lambda)}\right]} \tag{17}$$

$$J=\frac{(V_o+IR_e-k_oR_m)(\lambda^N-\lambda)(\lambda-1)}{\lambda(R_e+R_m)(1+\lambda^N)} \tag{18}$$

The foregoing equation (17) or its alternative equivalent form (18), revealed that J could be modified if $k_o$ had a value other than zero. If J, the shunt current in the first branch channel, was reduced, then the $j_n$'s (equation (12) were reduced. If $k_o$ had a value such that:

$$k_o=\frac{V_o+IR_e}{R_m} \tag{19}$$

then J was zero and likewise all the $j_n$'s were zero.

In this condition, equations (12), (15) and (16) reduce to:

$$i_n=I,\ k_n=k_o;\ j_n=0 \tag{20}$$

Thus, the foregoing suggested that the passage of a single protective current through the shared electrolyte in the manifold, in a device similar to that in FIG. 1, might minimize (reduce or eliminate) shunt or leakage currents.

The direction of this current is the same as the unprotected $k_n$ currents, i.e. the shunt current through the shared electrolyte.

It can also be seen from the above equations and the model in FIG. 1 that when a $k_o$ equal to that defined in equation (19) is passed through the shared electrolyte, that the voltage at each junction of the branch channel and the shared space is equal to that cell voltage. Thus, when the voltage drop through the branch channel is zero, there is no current. The voltage through the branch channel is nulled.

However, the voltages in the branch channels are not nulled when $k_o$ is different from equation (20). Nonetheless, the shunt currents in these channels were reduced by applying some protective current and this was found to be useful in practical electrochemical devices wherein an exact $k_o$ from equation (20) was not feasible.

From the practical standpoint, the utility of the foregoing approach required a non-zero $R_m$. Furthermore, the utility was enhanced by geometric effects which increased the magnitude of $R_m$. Such effects could be increasing the length of the shared electrolyte space between cells and a reduction of the cross-sectional area of the shared electrolyte space. The ratio of the protective current to the current of the electrochemical device was thus reduced when the ratio of $R_m/R_e$ was increased. Hydraulic factors, however, should be considered, in particular with circulating systems, and design compromises made between flow of electrolyte and the passage of current in the shared space may be appropriate.

The foregoing analysis assumes a model in which the values of $R_m$, $R_c$, $R_e$, and $V_o$ are the same for all cells. However, in a practical device, these values will be determined by system geometry and manufacturing tolerances. It is obvious, however, even in such cases, that the passage of protective current through the shared electrolyte will modify and reduce currents in the branch channels, although in such cases absolute nulling may not be accomplished.

Thus, to summarize, shunt currents (and their effects) can be reduced or eliminated by a passage of a current through the manifold electrolyte (in the same direction as the shunt currents) and the passage of this current will be accompanied by a voltage drop down the manifold. The voltage difference between the cells through the channels to the manifold will be reduced, and, as the current is increased, the voltage difference approaches zero. (At sufficiently large currents through the manifold, the voltage difference through the channels becomes negative).

The shunt currents from the cells through the shared electrolyte, as the voltage difference is nulled, become smaller and are eliminated. It follows that the power requirements for the reduction or elimination are determined by the resistance of the manifold and are independent of the resistance of the channels. The power requirements (P) for the protective current through the manifold directly above the N cells in a series of cells is approximated by;

$$P \approx \frac{(NV)^2}{NR_m} \quad (21)$$

where N is number of cells, V is the cell voltage and $R_m$ is the resistance of a single manifold segment.

In the patent application to P. G. Grimes, et al., Ser. No. 97,194, it is taught that the power requirements for reduction of shunt currents can be markedly reduced by adding connecting tunnels between the individual cell channels. The protective current is applied at the junction of the tunnel with the first channel and at the junction of the tunnel with the last channel so as to pass through the connecting tunnels. The power and current requirements are lower, the closer the tunnels are to the junction of the channels to the cells. Optionally, additional protective current may also be inserted in the manifold via $k_o$, as desired. Thus, it is possible to operate with $k_o$ equal to zero and to thereby achieve or approach total shunt current elimination.

The resistor network for this system and that of the present invention is shown in FIG. 4. The variables identical to those of the prior art FIG. 1 are identically labeled, the variables being as follows:

$R_e$=intracell electrolyte resistance;
$R_c$=channel resistance;
$R_m$=manifold resistance;
$R_T$=tunnel resistance;
$R_L$=leg resistance;
$t_o$=tunnel input current needed to minimize shunt currents;
$t_n$=tunnel current;
$l_n$=leg current;
$j_n$=channel shunt current;
$k_n$=manifold shunt current;
$i_n$=cell current;
$V_o$=open circuit cell voltage;
I=total terminal current The electrical circuit 200 of FIG. 4 will be used hereinafter to develop an analysis for the electrochemical devices shown in FIGS. 2*a*, 2*b*, and 3, respectively.

Referring to FIG. 2*a*, a dual electrolye (anolyte and catholyte) multicell battery device 100 is featured wherein protective currents are introduced to tapered tunnels 101*a*, 101*b*, 101*c*, and 101*d*, repectively, via electrodes 102*a*, 103*a*, 102*b*, 102*c*, 103*c*, and 102*d*, 103*d*, respectively. Electrochemical devices 100, 100′ and 100″ of FIGS. 2*a*, 2*b*, and 3, respectively, are typical battery devices shown for the exemplary purpose of describing the invention. Other devices utilizing the invention are of course contemplated, but are not illustrated or described herein for the sake of brevity.

The protective current in FIG. 2*a* is preferably introduced into tapered tunnels 101*a*, 101*b*, 101*c*, and 101*d*, respectively, at the junction of the tunnel 101*a* with the first and last channels 104*a* and 104*aa*, respectively; tunnel 101*b* with the first and last channels 104*b* and 104*bb*, respectively; tunnel 101*c* with the first and last channels 104*c* and 104*cc*, respectively; and tunnel 101*d* with the first and last channels 104*d* and 104*dd*, respectively, of the manifold and channel network illustrated in FIG. 2*a*.

The electrochemical device 100 generally comprises a plurality of cells 110 (typical in which anolyte and catholyte are respectively circulated through respective cell compartments 111*a* and 111*c*). The cells 110 are electrically connected, at least in part, in series, and fluidically communicate in parallel via a plurality of typical channels 104 which are fed by respective manifolds 106*a*, 106*b*, 106*c* and 106*d*, respectively.

Figure 2B:
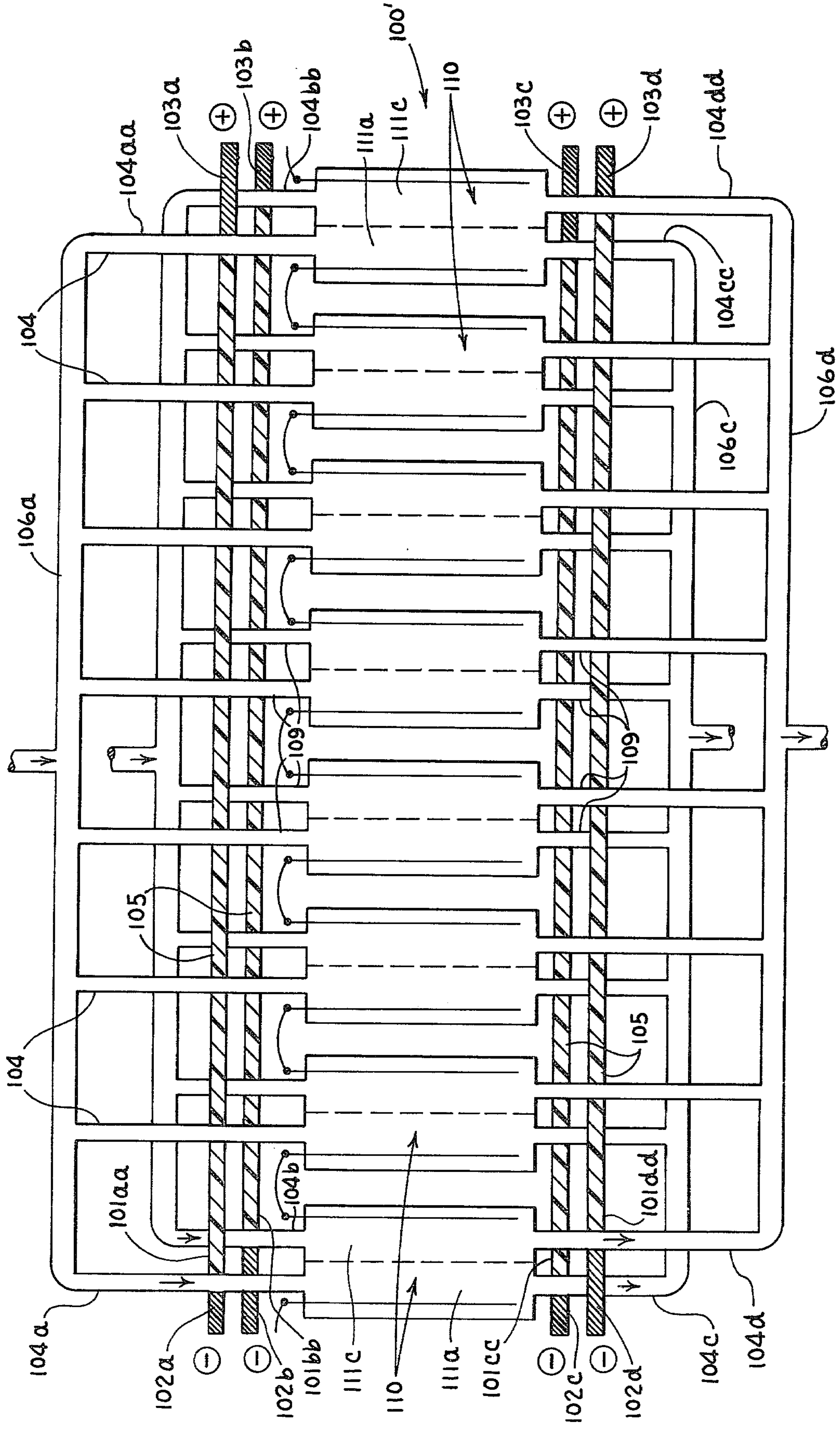
FIG. 2*b* is a schematic view of a dual electrolyte (anolyte and catholyte) multicell battery device featuring a second embodiment of the present invention.
Figure 3:
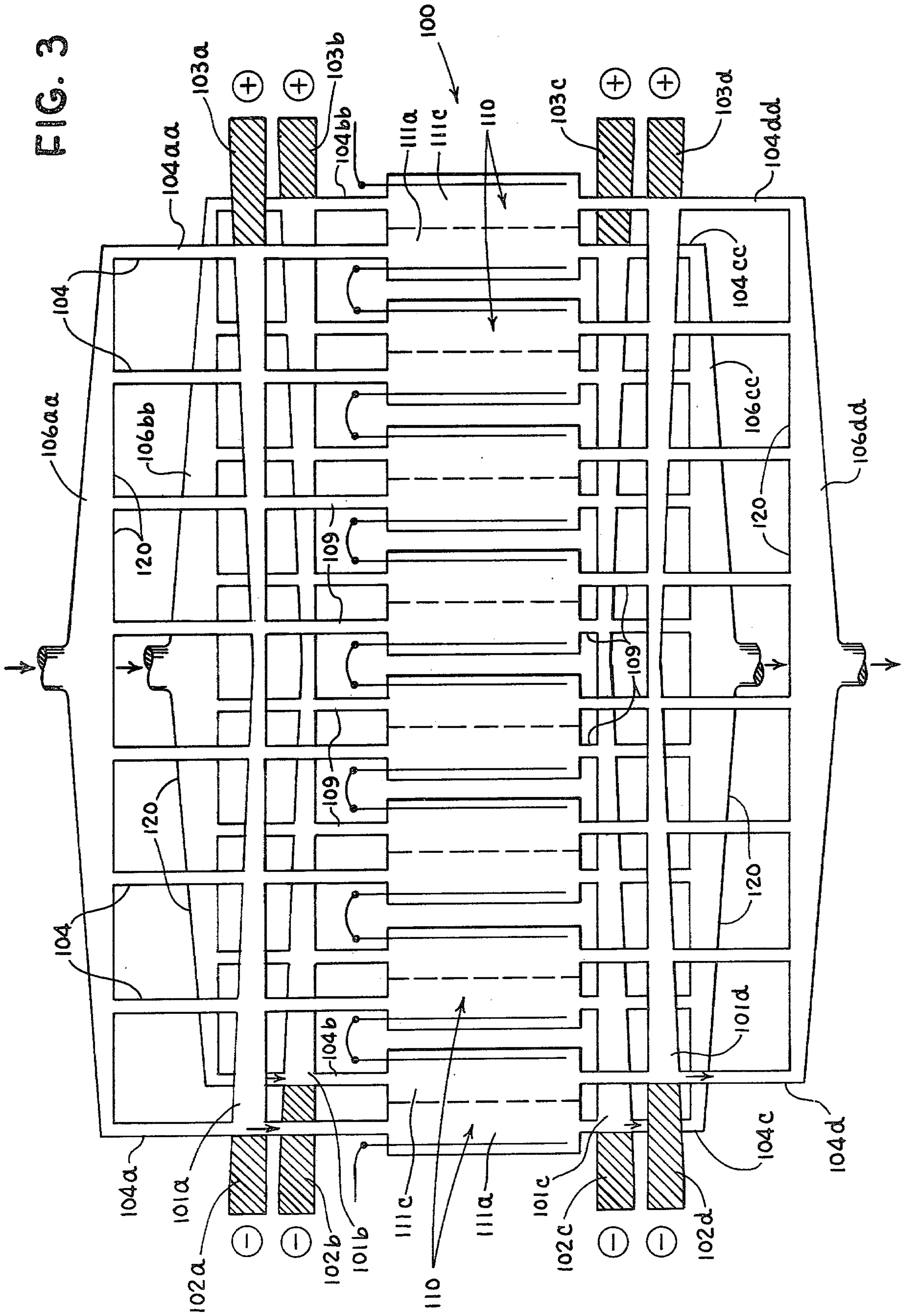
FIG. 3 is a schematic view of a dual electrolyte (anolyte and catholyte) multicell battery device featuring a third embodiment of the present invention.

While the manifolds of FIGS. 2*a*, 2*b* and 3 are shown being fed at a mid-portion thereof, it is to be understood that they could easily be fed at either or both ends, as befits the intended engineering purpose.

Where applicable, like elements are provided with the same numerical and alpha-numerical disignations in FIGS. 2*a*, 2*b*, and 3.

In the case of the prior and present teachings regarding the passage of protective current into the tunnels, the current passes through the electrolyte(s) in the channels 104 above tunnels 101*a* and 101*b*, and below the tunnels 101*c* and 101*d*, in addition to the manifolds. In the case where the tunnels contain electrolyte(s) (FIGS. 2*a* and 3), the protective current will also pass through the tunnels.

The tunnels 101*aa*, 101*bb*, 101*cc*, and 101*dd* of FIG. 2B are resistively tapered and do not contain electrolyte(s), as shown for FIGS. 2*a* and 3. In the device 101′ of FIG. 2*b*, the tunnels 101*aa*, 101*bb*, 101*cc* and 101*dd* are not part of the electrolyte system and may contain a plurality of solid resistive elements or segments 105, which elements are defined as one of the following: a salt bridge; an electronic conductor or resistor; an ion-exchange membrane; or a porous plug with ionic conductors, etc.

The only requirement for the tunnels of the present invention is that the tunnels be an ionic or electronic conductor. The segments 105 are distributed along the tunnels 101*aa*, 101*bb*, 101*cc* and 101*dd* as between the channels 104, and have an increasing resistance as they approach a mid-portion of their respective tunnel.

Where the device contains electrolyte in the tunnels as respective devices 101 and 101″ in FIGS. 2*a* and 3, the conduction is ionic throughout the tunnel-channel-manifold system. Where the device has solid resistive elements 105 in the tunnels 101*aa*, 101*bb*, 101*cc* and 101*dd*, as between channels 104 as illustrated in FIG. 2*b*, a Redox reaction is required at some or all of the tunnel-channel intersections in order to convert to and from ionic and electronic conduction. Such a scheme may be most desirable in a Redox battery system. Also, with electronic conductor elements 105, it is relatively easy to add or subtract current at intermediate points in the tunnel system. Such intermediate additions or subtractions are more difficult in ionic conduction tunnels.

The increasing of the resistance along the tunnels to their mid-portions in the respective devices 100, 100′ and 100″ depicted in FIGS. 2*a*, 2*b* and 3, is for the purpose of reducing or eliminating shunt currents with a minimum of input power. Each of the devices 100, 100′ and 100″ can be respectively represented by the analogue resistor circuit 200 shown in FIG. 4, and the analytical analyses for these representative devices will be with reference thereto.

In the case of the devices 100 and 100′ (tapered tunnels only) of FIGS. 2*a* and 2*b*, respectively, each cell 110 is modeled as an ideal voltage source $V_o$ equal to its OCV potential, in series, with the current resistance product. The resistances of each tunnel segment as between the channels (e.g., elements 105 in FIG. 2*b*) are chosen or defined as those which will provide a voltage drop equal to the voltage of the cell immediately beneath it. The small protective current passed into the tunnels via the electrodes may be supplied by an external source or from the terminus cells 110 of the electrochemical device itself. This protective current will effectively null the shunt voltages for each cell 110. When the tunnel current "$t_n$" is passed, it by definition will cause the cell voltages to be equal to the voltage drop through resistor "$R_{Tn}$" (FIG. 4), such that:

$$t_nR_{Tn}=V_o+IR_e \tag{22}$$

When this condition is met, the voltage on the channel legs 109 (FIGS. 2*a*, 2*b* and 3) between the tunnels 101 and the cells 110 is nulled, and there are no currents in the legs 109.

The electrical resistor network analog is then, equivalent to FIG. 4.

Kirchoff's current and voltage laws applied at the tunnel loop above the nth cell requires that
Where $$V_o+IR_e=t_nR_{Tn}=t_{n-1}R_{Tn-1} \tag{23}$$

$$k_{n-1}-k_n=-j_n \tag{24}$$

$$t_{n-1}-t_n=j_n \tag{25}$$

$$k_{n-1}R_m-j_nR_c+j_{n-1}R_c-t_{n-1}R_{Tn-1}=0 \tag{26}$$

where $k_n$=manifold current in the nth manifold segment.
$t_n$=current in the tunnel.
$j_n$=current in the channel.

and $R_e$, $R_m$ and $R_{Tn}$ are the corresponding resistances of the cell, manifold, and a tunnel.

Increasing the index by one, the nth+1 loop is $$k_nR_m-j_{n+1}R_c+j_nR_c-t_nR_{Tn}=0 \tag{27}$$

Subtracting (27) and (26), the k terms equal $j_n$ and the t terms cancel from (24) and (23).

$$-j_nR_m-2j_nR_c+j_{n+1}R_c+j_{n-1}R_c=0 \tag{28}$$

dividing (28) by $R_c$ $$j_{n+1}-Cj_n+j_{n-1}=0$$

where $$C=2+(R_m/R_c)$$

SOLUTION FOR CHANNEL CURRENTS

Linear constant coefficient difference equations (29) have power low solutions of the form $$j_n=D\lambda'^n \tag{30}$$

where $\lambda'$ can be found by substituting the assumed solution of (30) into (29)

$$D\lambda'^{n-1}[\lambda'^2-C\lambda'+1]=0 \tag{31}$$

For non-trivial solutions, $D\neq0$, $\lambda'\neq0$, the bracketed term is thus zero, $$\lambda' = C/2 \pm \sqrt{\left(\frac{C}{2}\right)^2 - 1} \tag{32}$$

From the manifold protection case, the most general solution of (29) is a linear combination of both solutions of (32).

$$j_n=D_1\lambda'^n+D_2\lambda'^{-n} \tag{33}$$

The current in the first channel $j_1=J'$ is an equal magnitude, but opposite direction to the current in the last channel $j_N=-J'$.

$$J_1=J'=D_1\lambda'+D_2\lambda'^{-1}$$

$$J_N=-J'=D_1\lambda'^n+D_2\lambda'^{-N} \tag{34}$$

with solutions $$D_1 = \frac{-J'(1+\lambda'^{-N+1})}{\lambda'^N-\lambda'^{-N+2}} \tag{35}$$

$$D_2 = \frac{J'\lambda'(\lambda'+\lambda'^N)}{\lambda'^N-\lambda'^{-N+2}}$$

From (34) and (35)

$$j_n = \frac{J'}{\lambda'^N-\lambda'}[\lambda'^{N-n+1}-\lambda'^n] \tag{36}$$

From (24), assuming (36), $$k_n = k_o + \sum_{p=1}^{n} j_p = k_o - \frac{J'\lambda'[\lambda'^n + \lambda'^{N-n} - 1 - \lambda'^N]}{(\lambda'^N - \lambda')(\lambda' - 1)} \quad (37)$$

Substituting (23), (36), (37) into (26)

$$J' = \frac{Vo + IRe - t_oR_m}{R_m + R_c\frac{(\lambda' - 1)(\lambda'^{N-1} + \lambda')}{(\lambda^N - \lambda)}} \quad (38)$$

Tunnel Currents

The current in the first tunnel $t_1$ is given by (25)

$$t_1 = t_o - j_1 \quad (39)$$

Subsequent tunnel currents $$t_2 = t_1 - j_2 = t_o - (j_1 + j_2) \quad (40)$$

$$t_3 = t_2 - j_3 = t_o - (j_1 + j_2 + j_3) \quad (41)$$

build on (17). The general equation for tunnel currents is $$t_n = t_o - \sum_{1}^{N} j_n \quad (42)$$

But, from equation 37, eq. 42 also equals eq. 43 or eq. 44.

$$t_n = t_o + k_o - k_n \quad (43)$$

$$t_n = t_o - J'\frac{\lambda'}{\lambda' - 1}\left[\frac{\lambda'^N + 1 - \lambda'^{N-n} - \lambda'^n}{\lambda'^N - \lambda'}\right] \quad (44)$$

the current in the tunnel at the center of the stack, $n=N/2$, is given by (45)

$$t_{N/2} = t_o + k_o - J'\frac{\lambda'}{\lambda' - 1}\left[\frac{(\lambda'^{N/2} - 1)^2}{\lambda'^N - \lambda'}\right] - k_o \quad (45)$$

and by rearranging eq. 45, we form (46)

$$t_o + k_o = t_{N/2} + K_{N/2} \quad (46)$$

Where, without loss of generality, the number of cells, N, can be taken as an even number.

But when $$k_o = \frac{V_o + IR_e}{R_m} \quad (47)$$

Eq. (45) reduces to (48), using eq. (38) and (39)

$$t_{N/2} = t_o \quad (48)$$

and eq. (46) then becomes eq. (49)

$$k_{N/2} = k_o \quad (49)$$

When $t_{N/2}=0$, $t_o=0$ and vice versa.

This value of $k_o$ in eq. (47) is that which is used in the non-tunnel manifold protection system. It is relatively high current compared to $t_o$, developed later (eq. (50) or (51)).

When $k_o=0$ the $t_o$ current is given by (50) from eq. (46).

$$t_o = t_{N/2} + k_{N/2} \quad (50)$$

When the resistance of the center tunnel is very large, or infinite, the value of $t_{N/2}$ is very small, or zero. Then (28) becomes, from eq. (37)

$$t_o = k_{N/2} = J'\frac{\lambda'}{\lambda' - 1}\left[\frac{(\lambda'^{N/2} - 1)^2}{\lambda'^N - \lambda'}\right] \quad (51)$$

This current is the minimum value to null the shuntage.

When the resistance of the center tunnel has a finite value, equation (50) applies and $t_o$ is larger by the amount of $t_{N/2}$.

In this case, the resistances of all of the tunnels are less, and the gradient of the resistances is not as steep.

In U.S. Pat. No. 4,197,169, Zahn et al., issued Apr. 8, 1980, the following expressions for the non-tunnel case were derived.

$$k_{N/2} = k_o + J\frac{\lambda}{\lambda - 1}\left[\frac{(\lambda^{N/2} - 1)^2}{\lambda^N - \lambda}\right] \quad (52)$$

and $$J = \frac{V_o + IR_e - k_oR_m}{R_m + R_e + (R_c + R_L)\frac{(\lambda - 1)(\lambda^{N-1} + \lambda)}{\lambda^N + \lambda}} \quad (53)$$

and $$\lambda = \beta/2 \pm \sqrt{\beta/2)^2 - 1} \quad (54)$$

where $$\beta = 2 + \frac{R_m + R_e}{R_c + R_L} \quad (55)$$

where $R_c+R_L$ equals the "$R_c$", the classical case previously cited.

When $R_e$ is much smaller than $R_m$, and $R_L$ is small compared to $R_c$ then C defined after eq. (29) approximately $=\beta$ defined in (55) so that $\lambda'$ of (32)$=\lambda$ (54), and the $k_{N/2}$ for the tapered tunnel case (51) approaches that of the classical shunt current case ($k_o=0$) eq. (52).

The power for the protection is a function of $k_{N/2}$. Thus, the power for the protection with tapered tunnels is minimal when $t_{N/2}=0$ and when $R_c$ is large. The power for protection approaches that dissipated in classical shunt as the value of $R_L$ is small. (If $t_{N/2}$ has a value, the power for protection is correspondingly increased.)

The value for a tunnel resistance is given by:

$$R_{T_n} = \frac{V_o + IR_e}{t_n} = \frac{V_o + IR_e}{t_o - \sum_{n=1}^{N} j_n} \quad (56)$$

When $k_o=0$ and $t_{N/2}=0$;

$$t_o = k_{N/2} = \frac{J'\lambda'}{\lambda' - 1}\left[\frac{\pm(\lambda'^{N/2} - 1)^2}{\lambda'^N - \lambda'}\right]$$

then (56) equals, from (44) and (37)

$$R_{T_n} = \frac{V_o + IR_e}{J'\frac{\lambda'}{\lambda' - 1}\left[\frac{\lambda'^{N-n} + \lambda'^n - 2\lambda'^{N/2}}{\lambda'^N - \lambda'}\right]} \quad (57)$$

and from (38)

$$R_{Tn} = \frac{1}{\left[\dfrac{1}{R_m + R_c\dfrac{(\lambda'-1)(\lambda'^{N-1}+\lambda')}{\lambda'^N-\lambda'}}\right]\left[\dfrac{\lambda'}{(\lambda'-1)}\right]\left[\dfrac{(\lambda'^{N-n}+\lambda'^n-2\lambda'^{N/2})}{(\lambda'^N-\lambda')}\right]} \quad (58)$$

When $t_{N/2}$ and $R_{TN/2}$ have values and $k_o=0$, eq. (50) applies.

$$t_o=t_{N/2}+k_{N/2} \quad (50)$$

Then, from eqs. (43) and (46)

$$t_n=t_{N/2}+k_{N/2}-k_n \quad (59)$$

Using eq. (22) eq. (59) becomes $$t_n = \frac{V_o + IR_e}{R_{TN/2}} + k_{N/2} - k_n \quad (60)$$

When this is substituted into eq. (56), and the reduction is followed, eq. (61) is formed.

$$R_{Tn} = \frac{1}{\left[R_m + R_c\dfrac{(\lambda'-1)(\lambda'^{N-1}+\lambda')}{\lambda'^N-\lambda'}\right]\left[\dfrac{\lambda'}{(\lambda'-1)}\right]\left[\dfrac{(\lambda'^{N-n}+\lambda'^n-2\lambda'^{N/2})}{(\lambda'^N-\lambda')}\right]} + \frac{1}{R_{TN/2}} \quad (61)$$

The value of $R_{Tn}$ is determined by the geometry of the system with the corresponding resistances and not by the voltage or currents of the cells in the stack. In this case, the shunt currents from a series-connected system with shared electrolyte can be controlled, reduced, or eliminated by the insertion of appropriate $t_o$ current into the tapered tunnel network of an appropriate designed geometry. The voltage requirement is $(V_o+IR_e)(N-1)$. The current requirement is given by eq. (50) or eq. (51). The power requirements are the product of voltage and current values.

The power requirements are less than those for the manifold protection case (i.e., $k_o=(V_o+IR_e)/R_m$), and in the limit, approach the power which would have been dissipated in shuntage in the unprotected case.

The turn-around current efficiencies were calculated from the above analysis, and tabulated below in Table I. Coulombic efficiency was assumed as 100%, i.e., no self-discharging. The pumping energies were not calculated and are a function of manifold and cell design. The main pressure drops are in the manifold and in the right angle turns into the channels. The values assumed for the subject calculations were:

$V_o=1.8$

Number of cells 26 and 52
Center cell distance 0.093 inch
Electrolyte resistance 15 ohm cm.
Manifold diameter ⅛ and ¼ inch (0.05 and 0.95 cm.)
Manifold segment resistance 4.973 and 18.55 ohms
Channel resistance 500, 1500, 3,000 and 6,000 ohms
Stack currents 10 to 30 ma/$cm^2$
Cell area 600 $cm^2$ and 1,000 $cm^2$

TABLE I

TURN-AROUND CURRENT EFFICIENCY %

| Quadrant Area $cm^2$ | Apparent System Current Density mA/$cm^2$ Charge/Discharge | $R_m$ 4.973 ohm . cm Diameter 0:95 cm — Manifold Protected | Tunnel Protected | | | $R_m$ 18.05 Diameter 0.5 cm — Manifold Protected | Tunnel Protected |
|---|---|---|---|---|---|---|---|
| | | | $R_c$ 500 | $R_c$ 1500 | $R_c$ 6000 | | $R_c$ 1500 |
| 150 | | $k_o$ = .352 | $t_o$ = .2995 | .2019 | .0798 | $k_o$ = .09698 | $t_o$ = .0857 |
| | 30/30 | 85.5 | 87.5 | 91.4 | 96.5 | 95.8 | 96.3 |
| | 20/30 | 81.8 | 84.3 | 89.3 | 95.6 | 94.7 | 95.3 |
| | 10/30 | 71.0 | 77.7 | 82.8 | 93.0 | 91.5 | 92.5 |
| | 10/10 | 62.0 | 66.6 | 76.3 | 89.9 | 87.9 | 89.2 |
| | 30/10 | 74.6 | 75.0 | 84.2 | 93.3 | 91.9 | 98.7 |
| 250 | 30/30 | 91.0 | 92.3 | 94.8 | 97.9 | 97.4 | 97.7 |
| | 20/30 | 88.8 | 90.4 | 93.5 | 97.4 | 96.8 | 97.2 |

From the above table, it can be seen that, as regards protective current and turn-around current efficiencies, the efficiencies increase with the use of tapered tunnels, with higher current densities, smaller diameter manifolds, long channels with small cross-sectional area, and with larger cell electrode areas. These factors must be balanced, however, with other design considerations when constructing a viable, commercial system.

In another embodiment of this invention, it is also contemplated to provide tapered manifolds as well as tapered tunnels, as is illustrated in FIG. 3. The manifolds 106*aa*, 106*bb*, 106*cc*, and 106*dd*, respectively, are shown with a taper which provides a decreasing resistance towards their respective mid-portions.

The resistances of the tunnels 101*a*, 101*b*, 101*c*, and 101*d*, respectively, increases towards their respective mid-portions, as before. The voltage drop through each manifold segment 120 is a constant "W", and the voltage drop through each tunnel segment 105 is equal to that of the corresponding cell 110 disposed beneath it:

$$(V_o+IR_e)=t_nR_{Tn}$$

Figure 5:
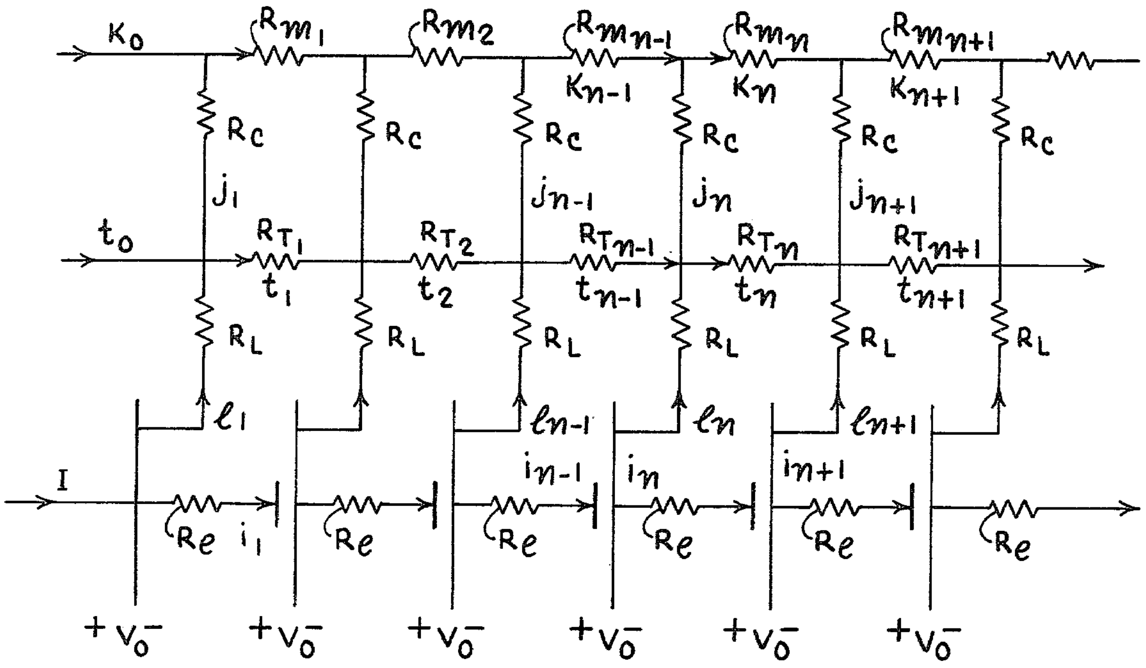

With these design conditions, there is no voltage difference between the cells and the tunnel-channel junctions. With the voltage nulled, there is no current flow from the cells 110 into legs 109 leading to the tunnel/channel junctions, i.e., there are no shunt currents from the cells. The cells act as if they are individual cells, in series, with no common electrolyte. The power consumed for this design is less than that of other shunt-nulling designs, as will be set forth in the following analysis using the electrical analogue circuit model of FIG. 5. For purposes of this foregoing analysis, the following nomenclature will be used:

$V_o$=Open circuit voltage of a cell
I=Charge or discharge current of the first cell
$R_e$=Resistance of a cell
N=Number of cells in series
$N(V_o+IR_e)$=Voltage of the series of cells without common/shared electrolyte
$i_n$=Current of a cell in the series of cells
$V_o+i_nR_e$=Voltage of that cell
$R_L$=Resistance of the channel between the cell and the tunnel junction
$R_c$=Resistance of the channel between the junction of the tunnel and the manifold
$R_{mn}$=Resistance of a manifold segment between channel n and channel n+1
$k_n$=The current passing through the resistance $R_{mn}$, (manifold segment between the n and (n+1) channels)
$R_{Tn}$=Resistance of a tunnel segment between channel n and n+1
$t_n$=The current passing through the resistance $R_{Tn}$
$j_n$=The current passing through the channel resistance $R_c$
W=Voltage drop through a manifold segment
$V_o+IR_e$=Voltage drop through a tunnel segment
$t_o$=Insert current at the junction of the first tunnel and the first channel
$k_o$=Insert current at the junction of the manifold and first channel
$k_N$=The exit current at the junction of the manifold and the last channel The mathematical analysis for the subject embodiment of FIG. 3 is as follows:

$$k_{N/2-1}R_{mN/2-1}=k_{N/2}R_{mN/2}=W \quad (62)$$

$$t_{N/2-1}R_{TN/2-1}=t_{N/2}R_{TN/2}=V_o+IR_e \quad (63)$$

Without loss of generality, it is assumed that the number of cells, N, is even, and in the center, with N even $$j_{N/2}=-j_{N/2+1} \quad (64)$$

Without loss of generality, we assume that the number of cells, N, is even, in this analysis.

Then by Kirchoff rules $$j_{N/2-1}R_c+k_{N/2-1}R_{mN/2-1}-j_{N/2}R_c-t_{N/2-1}R_{TN/2-1}=0 \quad (65)$$

$$j_{N/2}R_c\, k_{N/2}R_{mN/2}-j_{N/2+1}R_c-t_{N/2}R_{TN/2}=0 \quad (66)$$

From (64) and (66)

$$2j_{N/2}R_c=t_{N/2}R_{TN/2}-k_{N/2}R_{mN/2} \quad (67)$$

$$\begin{aligned} j_{N/2}R_c &= [\tfrac{1}{2}t_{N/2}R_{TN/2} - k_{N/2}R_{mN/2}] \\ &= \tfrac{1}{2}[V_o + IR_E - W] \end{aligned} \quad (68)$$

$$j_{N/2+1}R_c=-\tfrac{1}{2}[V_o+IR_e-W] \quad (69)$$

from (68) and (65)

$$j_{N/2-1}R_c=t_{N/2-1}R_{TN/2-1}-k_{N/2-1}R_{mN/2-1}+\tfrac{1}{2}[V_o+IR_e-W] \quad (70)$$

$$\begin{aligned} &= V_o + IR_e - W + \tfrac{1}{2}[V_o + IR_e - W] \\ &= 3/2[V_o + IR_e - W] \end{aligned} \quad (70a)$$

by Kirchoff rules $$j_{N/2-2}R_c-t_{N/2-2}R_{TN/2-2}+k_{N/2-2}R_{TN/2-2}-j_{N/2-1}R_c=0 \quad (71)$$

rearrange (71) and substitute (70*a*)

$$\begin{aligned} j_{N/2-2}R_c &= t_{N/2-2}R_{TN/2-2} - k_{N/2-2}R_{TN/2-2} + j_{N/2-1}R_C \\ &= V_o + IR_e - W + 3/2[V_o + IR_e - W] \end{aligned} \quad (72)$$

$$j_{N/2-2} = \frac{5}{2R_e}[V_o + IR_e - W] \quad (73)$$

In general, e.g., (68), (69), (70), (70*a*), (73) are of the form $$j_n = \frac{N-2n+1}{2R_c}[V_o + IR_e - W] \quad (74)$$

$$k_n = K_o + \sum_{n=1}^{n}\left(\frac{N-2n+1}{2R_c}\right)(V_o + IR_e - W)$$

The current in the manifold segment $k_n$ is the sum of the previous j plus $k_o$ $$\begin{aligned} k_n &= K_o + \sum_{n=1}^{N}\left(\frac{N-2n+1}{2R_c}\right)(V_o + IR_e - W) \\ &= k_o + \frac{n(N-n)}{2R_c}(V_o + IR_e - W) \end{aligned} \quad (75)$$

The current in the center manifold segment is the sum of all the previous $k_n$ plus $k_o$ $$\begin{aligned} k_{N/2} &= k_o + \sum_{n=1}^{N=N/2}\frac{(N-2n+1)}{2R_c}(V_o + IR_e - W) \\ &= k_o + \frac{N^2}{8R_c}(V_o + IR_e - W) \end{aligned} \quad (76)$$

The current in the first manifold segment is equal to the first channel current $j_1$ (plus $k_o$)

$$j_1 = k_1 - k_o = \frac{N-1}{2R_c}(V_o + IR_e - W)\; W = k_1R_{m1}; \quad (77)$$

at $K_o = 0$ $$k_1R_{m1} = \frac{N-1}{2R_c}(V_o + IR_e - W)R_{m1} = W \quad (78)$$

$$W = \frac{(N-1)R_{m1}(V_o + IR_e)}{2R_c + (N-1)R_{m1}} \quad (79)$$

$$R_{m1} = \frac{8R_cW}{(N-1)(V_o + IR_e - W)} \quad (80)$$

from eq. (76) when $k_o$=0

$$k_{N/2} = \frac{N^2}{8R_c}(V_o + IR_e - W)$$

and from eq. (62)

$$k_{N/2}R_{mN/2} = W$$

$$k_{N/2}R_{mN/2} = \frac{N^2}{8R_c}(V_o + IR_e - W)R_{mN/2} = W \quad (81)$$

$$W = \frac{N^2 R_{mN/2}(V_o + IR_e)}{8R_c + N^2 R_{mN/2}} \quad (82)$$

and $$R_{mN/2} = \frac{8R_cW}{N^2(V_o + IR_e - W)}$$

The ratio of the resistances $R_{mN/2}$ and $R_{m1}$ when $k_o=0$ is $$\frac{R_{mN/2}}{R_{m1}} = \frac{4(N-1)}{N^2} \quad (83)$$

In general, $$R_{mn} = \frac{W}{k_n} = \frac{W}{k_o + \frac{4n(N-n)}{8R_c}(V_o + IR_e - W)} \quad (84)$$

at $k_o = 0$ $$W = \frac{R_{mn}(4n)(N-n)(V_o + IR_e)}{8R_c + (4n)(N-n)R_{mn}} \quad (84a)$$

The ratio of the currents in the manifold segments can be obtained from eq. (76) and (77)

$$\frac{k_{N/2}}{k_1} = \frac{\frac{N^2}{8R_c}(V_o + IR_e - W) + k_o}{\frac{(N-1)}{2R_c}(V_o + IR_e - W) + k_o} \quad (85)$$

when $k_o=0$ $$\frac{k_{N/2}}{k_1} = \frac{N^2}{4(N-1)} \quad (86)$$

The current inserted at the node $j_1$, $t_1$, $l_1$ is $$t_o = j_1 + l_1 + t_1 \text{ when } l_1 = 0 \quad (87)$$

$$t_o = j_1 + t_1 \quad (88)$$

thus $$t_1 = t_o - j_1 \quad (89)$$
$$t_2 = t_o - (j_1 + j_2)$$
$$t_3 = t_o - (j_1 + j_2 + j_3)$$

$$t_n = t_o - \sum_{n=1}^{N} j_n = t_o - k_n - k_o \quad (90)$$

$$t_o + k_o = t_m + k_m = t_N + k_{N/2} \text{ if } k_o = 0 \quad (91)$$

$$t_o = k_{N/2} + t_{N/2} \quad (92)$$

$$t_o = \frac{N^2}{8R_c}(V_o + IR_e - W) + t_{N/2} \quad (93)$$

$t_o$ is least when $t_{N/2} = 0$.

-continued $$t_n = \frac{N^2 - 4n(N-n)(V_o + IR_e - W)}{8R_c} \text{ when } t_{N/2},\ k_o = 0 \quad (94)$$

For the special case of manifold insert current, $$t_o + k_o = k_{N/2} + t_{N/2} \text{ but when } t_{N/2}, t_o = 0 \quad (95)$$

$$k_o = k_{N/2} \quad (96)$$

but from (76) then $$k_o = k_o + \frac{N^2}{8R_c}(V_o + IR_e - W) \text{ then}$$

$$\frac{N^2}{8R_c}(V_o + IR_e - W) = 0 \quad (97)$$

$$V_o + IR_e = W \text{ then from (2)} \quad (98)$$

$$k_{N/2}R_{mN/2} = W = V_o + IR_e \quad (99)$$

$$R_{mN/2} = \frac{V_o + IR_e}{k_{N/2}} = \frac{V_o + IR_e}{k_o} \quad (100)$$

$$k_o = \frac{V_o + IR_e}{R_{mN/2}} \quad (101)$$

This is similar to the manifold protection case form. Thus, the insert current at the manifold is larger than the tunnel insert current. From (91)

$$t_n = k_{N/2} - k_n + t_{N/2} \quad (102)$$

$$t_n = \frac{[N^2 - 4n(N-n)](V_o + IR_e - W)}{8R_c} \quad (103)$$

$t_n$ has the least value when $t_{N/2}=0$. The (93) and are equivalent when $n=0$.

$$t_nR_{Tn} = V_o + IR_e \quad (104)$$

$$R_{Tn} = \frac{V_o + IR_e}{t_n} \quad (105)$$

$$= \frac{V_o + IR_e}{\frac{[N^2 - 4n(N-n)](V_o + IR_e - W)}{8R_c} + t_{N/2}} \quad (106)$$

When $t_{N/2}=0$, the injection current and the protective power are the least.

$$R_{Tn} = \frac{(V_o + IR_e)(8R_c)}{[N^2 - 4n(N-n)][V_o + IR_e - W]} \quad (107)$$

Substituting for W from (84)

$$R_{Tn} = \frac{8R_c + 4n(N-n)R_{mn}}{N^2 - 4n(N-n)} \quad (108)$$

In summation, when $k=0$, $t_{N/2}=0$; it is the least power situation for protection.

$$R_{Tn} = \frac{8R_c + 4_n(N-n)R_{mn}}{N^2 - 4n(N-n)}$$

$$R_{mn} = \frac{8R_cW}{4n(N-n)(V_o + IR_e - W)}$$

-continued $$\frac{R_{mN/2}}{R_{m1}} = \frac{4(N-1)}{N^2}$$

$$W = \frac{4n(N-n)R_{mn}(V_o + IR_e)}{8R_c + 4n(N-n)R_{mn}}$$

$$t_o = \frac{N^2}{8R_c}(V_o + IR_e - W)$$

$$t_n = \frac{N^2 - 4n(N-n)}{8R_c}(V_o + IR_e - W)$$

$$= \frac{N^2 - 4n(N-n)\,(V_o + IR_e)}{8R_c + 4n(N-n)R_{mn}}, \quad n > o$$

A network of 10 D cell size Nicd batteries, ceramic resistors representing manifold segments, $R_m$, channels, $R_c$, legs, $R_2$, and variable resistors (patentiometers) representing tunnels, $R_T$, was constructed to simulate a common electrolyte series cell battery system. The manifold segments were selected from a stack of 100 ohm resistors. The channel and leg resistors were selected from a stack of 1500 and 10 ohm resistors (see Table II below). The variable resistors were adjusted to the values in Table IIa which resulted in zero voltage drop through the leg resistors $R_L$.

In Table IIa are listed the measured values of the voltage drops across the resistors and the calculated currents when a charging current of 200 ma at a voltage of 14.20 volts was applied to the terminals of the system. This applied current divided. A portion went to the first tunnel channel and leg node (−12.8 ma, the sum of $R_c$, and $R_{T1}$) and the remainder went to charge the battery string. Each battery received an equal charge current since the voltage drops (and correspondingly the current) through the leg resistors, $R_L$ 1-11, was zero.

As can be seen in Table II, the resistance values of $R_{Tn}$ increase toward the center of the stack and then decrease, from 141 to 251, back to 143 ohms.

The values of $R_{TN/2}$ would result in a different gradient of resistances for $R_{Tn}$ (eqs. (58) and (61)), and result in different tunnel insert currents. This example shows, however, that with appropriate values of resistance for the channels, manifold or tunnels, the shunt currents can be controlled, reduced or eliminated with an appropriate tunnel insert current.

As shown in U.S. Pat. No. 4,197,169 to Zahn et al, with a $k_o$ insert current into the manifold, the shunt currents can be reduced or eliminated. In the system discussed above, without tapered tunnels, the resistance of a manifold segment between cells is 100 ohms. The $k_o$ current would be 14.2 ma under the above conditions in Table IIa.

TABLE II

Tapered Tunnel Resistor Values

| | Resistor | Ohms | | Resistor | Ohms |
|---|---|---|---|---|---|
| $R_L$ | 1 | 10 | $R_m$ | 1 | 102 |
| | 2 | 10 | | 2 | 101 |
| | 3 | 10.1 | | 3 | 101 |
| | 4 | 10.1 | | 4 | 102 |
| | 5 | 9.9 | | 5 | 102 |
| | 6 | 10.1 | | 6 | 102 |
| | 7 | 10.1 | | 7 | 102 |
| | 8 | 10.1 | | 8 | 101 |
| | 9 | 9.9 | | 9 | 101 |
| | 10 | 9.9 | | 10 | 101 |
| | 11 | 9.9 | | | |
| $R_c$ | 1 | 1501 | $R_T$ | 1 | 141 |
| | 2 | 1504 | | 2 | 177 |
| | 3 | 1510 | | 3 | 215 |
| | 4 | 1510 | | 4 | 240 |
| | 5 | 1507 | | 5 | 251 |
| | 6 | 1510 | | 6 | 250 |
| | 7 | 1501 | | 7 | 240 |
| | 8 | 1503 | | 8 | 214 |
| | 9 | 1504 | | 9 | 178 |
| | 10 | 1510 | | 10 | 143 |
| | 11 | 1501 | | | |

TABLE IIa

Tapered Tunnel Shunt Current Network

System Charge Current 200 ma
Tunnel Insert Current 12.8 ma
System Voltage 14.20-14.19 volts

| | Resistor | Voltage Drop Across Resistor | Current | | Resistor | Voltage Drop Across Resistor | Current |
|---|---|---|---|---|---|---|---|
| $R_L$ | 1 | 0 | 0 | $R_m$ | 1 | .28 | 2.79 |
| | 2 | 0 | 0 | | 2 | .49 | 4.83 |
| | 3 | 0 | 0 | | 3 | .63 | 6.22 |
| | 4 | 0 | 0 | | 4 | .70 | 6.90 |
| | 5 | 0 | 0 | | 5 | .76 | 7.48 |
| | 6 | 0 | 0 | | 6 | .76 | 7.47 |
| | 7 | 0 | 0 | | 7 | .72 | 7.10 |
| | 8 | 0 | 0 | | 8 | .64 | 6.32 |
| | 9 | 0 | 0 | | 9 | .48 | 4.80 |
| | 10 | 0 | 0 | | 10 | .28 | 2.77 |
| | 11 | 0 | 0 | | | | |
| $R_c$ | 1 | 4.20 | 2.79 | $R_T$ | 1 | 1.42 | 10.06 |
| | 2 | 3.06 | 2.03 | | 2 | 1.42 | 8.03 |
| | 3 | 2.13 | 1.41 | | 3 | 1.41 | 6.57 |
| | 4 | 1.34 | 0.89 | | 4 | 1.42 | 5.91 |
| | 5 | 0.65 | 0.44 | | 5 | 1.42 | 5.64 |
| | 6 | 0 | 0 | | 6 | 1.41 | 5.66 |
| | 7 | −0.65 | −0.44 | | 7 | 1.42 | 5.92 |
| | 8 | −1.35 | −0.90 | | 8 | 1.43 | 6.66 |
| | 9 | −2.14 | −1.42 | | 9 | 1.42 | 7.96 |
| | 10 | −3.07 | −2.03 | | 10 | 1.42 | 9.92 |
| | 11 | −4.21 | −2.81 | | | | |

Having thus described the invention, what is desired to be protected by Letters Patent is presented by the following appended claims.

What is claimed is:

1. An electrochemical device, comprising:

at least one common manifold;

a plurality of cells fluidically communicating through corresponding channels with said one common manifold, said manifold and channels adapted to contain a common electrolyte for said cells, said electrolyte providing an electrical electrolytic conductive bypass path around said cells which is capable of resulting in undesirable shunt currents;

at least one tunnel intersecting and connecting with each of said corresponding channels, said tunnel having a given electrical resistance as between said corresponding channels which increases towards a mid-portion of said tunnel, for substantially eliminating any voltage difference between each of said cells and their corresponding tunnel and channel intersections when a protective current is passed into said tunnel for providing effective reduction of said shunt currents; and means for passing a protective current into said one tunnel.

2. The electrochemical device of claim 1, wherein said tunnel containing said common electrolyte and is tapered towards a mid-portion to provide said increase in resistance in said tunnel.

3. The electrochemical device of claim 1, wherein said tunnel contains a non-electrolyte, resistive segment disposed between each corresponding channel.

4. The electrochemical device of claim 1, wherein said cells are electrically connected, at least in part, in series.

5. The electrochemical device of claim 1, wherein said electrochemical device is a battery.

6. The electrochemical device of claim 1, wherein said electrochemical device is a fuel cell device.

7. The electrochemical device of claim 1, wherein said electrochemical device is an electrowinning device.

8. The electrochemical device of claim 1, wherein said electrochemical device is an electrolyzer.

9. The electrochemical device of claim 1, wherein said device contains more than one electrolyte.

10. The electrochemical device of claim 1, wherein said cells are monopolar.

11. The electrochemical device of claim 1, wherein said cells are bipolar.

12. The electrochemical device of claim 1, wherein said device comprises more than one manifold.

13. The electrochemical device of claim 1, wherein said device comprises more than one tunnel.

14. The electrochemical device of claim 1, wherein said device comprises four manifolds and four tunnels.

15. The electrochemical device of claim 1, wherein said electrochemical device is an electrorefining device.

16. The electrochemical device of claim 1, wherein said electrochemical device is an electrochemical reactor.

17. An electrochemical device, comprising:

at least one common manifold having a given electrical resistance along said manifold which decreases towards a mid-portion thereof;

a plurality of cells fluidically communicating through corresponding channels with said one common manifold, said manifold and channels adapted to contain a common electrolyte for said cells, said electrolyte providing an electrical electrolytic conductive bypass path around said cells which is capable of resulting in undesirable shunt currents;

at least one tunnel intersecting and connecting with each of said corresponding channels, said tunnel having a given electrical resistance as between said corresponding channels which increases towards a mid-portion of said tunnel, for substantially eliminating any voltage difference between each of said cells and their corresponding tunnel and channel intersections when a protective current is passed into said tunnel for providing effective reduction of said shunt currents; and means for passing a protective current into said one tunnel.

18. The electrochemical device of claim 17, wherein said tunnel containing said common electrolyte and is tapered towards a m id-portion to provide said increase in resistance in said tunnel.

19. The electrochemical device of claim 17, wherein said tunnel contains a non-electrolyte, resistive segment disposed between each corresponding channel.

20. The electrochemical device of claim 17, wherein said cells are electrically connected, at least in part, in series.

21. The electrochemical device of claim 17, wherein said electrochemical device is a battery.

22. The electrochemical device of claim 17, wherein said electrochemical device is a fuel cell device.

23. The electrochemical device of claim 17, wherein said electrochemical device is an electrowinning device.

24. The electrochemical device of claim 17, wherein said electrochemical device is an electrolyzer.

25. The electrochemical device of claim 17, wherein said device contains more than one electrolyte.

26. The electrochemical device of claim 17, wherein said cells are monopolar.

27. The electrochemical device of claim 17, wherein said cells are bipolar.

28. The electrochemical device of claim 17, wherein said device comprises more than one manifold.

29. The electrochemical device of claim 17, wherein said device comprises more than one tunnel.

30. The electrochemical device of claim 17, wherein said device comprises four manifolds and four tunnels.

31. The electrochemical device of claim 17, wherein said electrochemical device is an electrorefining device.

32. The electrochemical device of claim 17, wherein said electrochemical device is an electrochemical reactor.

33. The electrochemical device of claim 17, wherein said manifold is tapered towards its mid-portion to provide said increase in resistance along said manifold.

* * * * *